United States Patent [19]

Tomita et al.

[11] 3,994,061

[45] Nov. 30, 1976

[54] MACHINE TOOL WITH AN AUTOMATIC TOOL CHANGER

[75] Inventors: Tamaki Tomita, Okazaki; Hiroshi Okada, Obu; Katsuo Inoue, Nagoya, all of Japan

[73] Assignee: Toyoda Koki Kabushiki Kaisha, Japan

[22] Filed: Aug. 25, 1975

[21] Appl. No.: 607,708

[30] Foreign Application Priority Data

Aug. 25, 1974 Japan.............................. 49-97429

[52] U.S. Cl................................. 29/568; 90/11 A
[51] Int. Cl.$^2$........................................ B23Q 3/157
[58] Field of Search...................... 29/568; 90/11 A

[56] References Cited
UNITED STATES PATENTS

| | | | |
|---|---|---|---|
| 3,422,724 | 1/1969 | Zankl et al.................. | 29/568 X |
| 3,545,075 | 12/1970 | Ollearo ...................... | 29/568 |
| 3,587,359 | 6/1971 | McCash et al................ | 29/568 X |
| 3,791,022 | 2/1974 | Kurimoto et al.............. | 29/568 |

*Primary Examiner*—Othell M. Simpson
*Assistant Examiner*—Z. R. Bilinsky
*Attorney, Agent, or Firm*—Oblon, Fisher, Spivak, McClelland & Maier

[57] ABSTRACT

A machine tool is provided with a transfer arm for interchanging a first tool, inserted into a rotary spindle and positioned at a predetermined angular position, with another tool stored within a storage magazine, the spindle and each of the tools being respectively provided with drive and driven protrusions, which are engaged with each other for a positive drive operation by inching the spindle in a tool exchange operation. Interference preventers, which are provided upon the magazine in order to respectively cooperate with the driven protrusions, angularly correspond to the drive protrusion positioned at the predetermined angular position, such that each of the tools may be inserted into the spindle without interference between the drive and driven protrusions.

5 Claims, 6 Drawing Figures

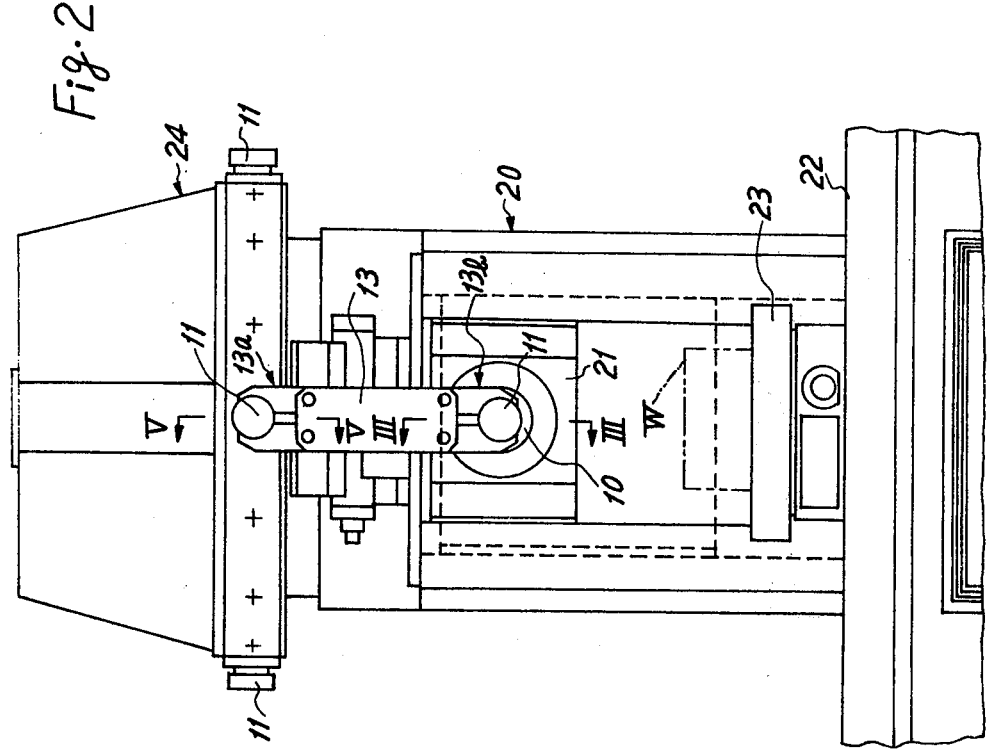
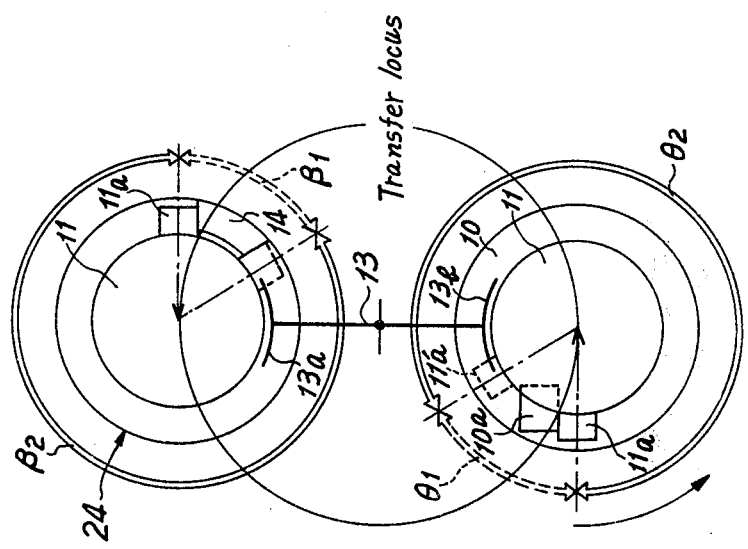

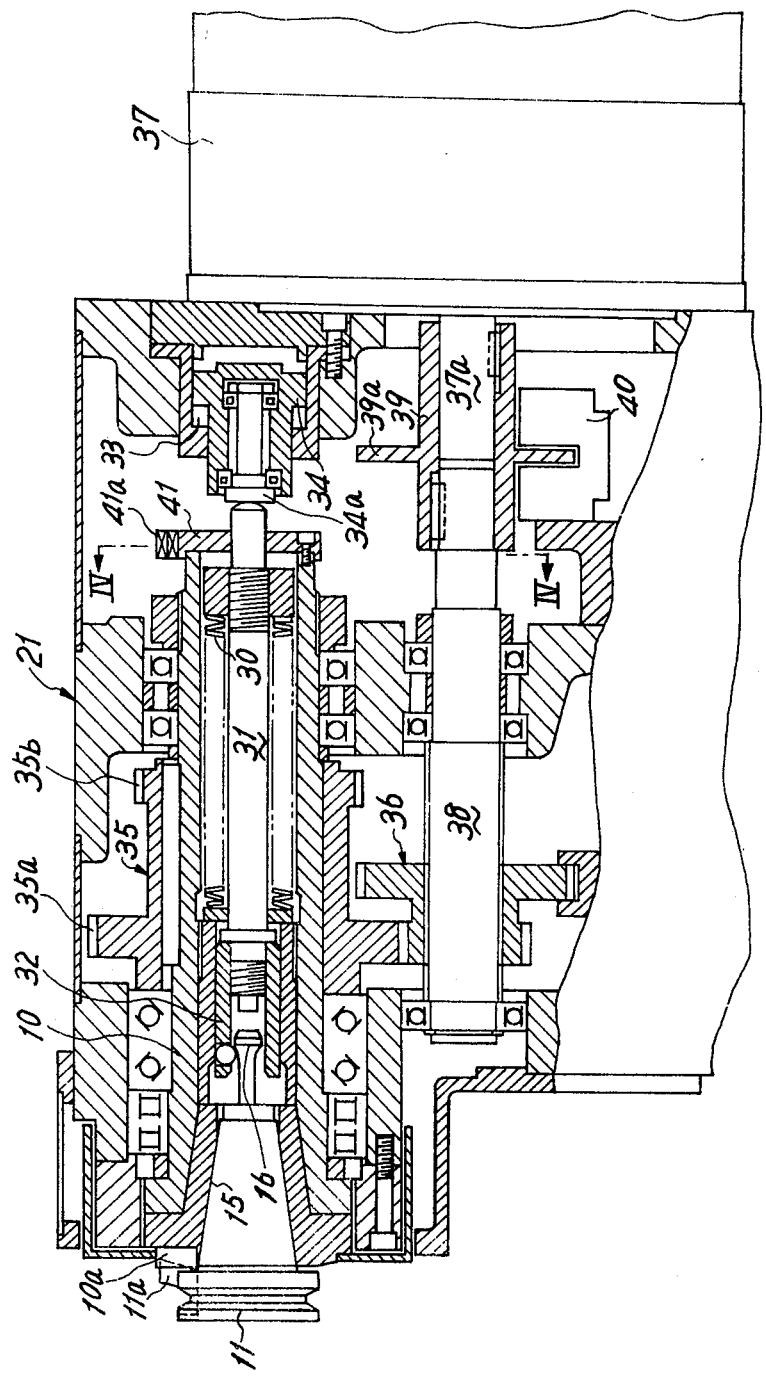

MACHINE TOOL WITH AN AUTOMATIC TOOL CHANGER

BACKGROUND OF THE INVENTION

1. Field of the Invention

The present invention relates generally to machine tools and more particularly to a machine tool with an automatic tool changer for exchanging tools between a rotary spindle and a storage magazine storing a plurality of tools.

2. Description of the Prior Art

Within a tool changer heretofore known, such as for example, the device disclosed within U.S. Pat. No. 3,704,510, a drive key and a key-way complemental thereto are respectively provided upon each of the tools and a rotary spindle so as to transmit the rotation of the spindle to the tools. Prior to a tool exchange operation, the spindle is stopped at a predetermined angular position, and in this connection, the tools stored within a storage magazine are prevented from experiencing any angular deviation as a result of a respective engagement between the drive keys of the tools and the key slots formed upon the magazine.

However, within such a tool changer, it is necessary to form the drive keys, the key-way, and the key slots with a high degree of precision thereby resulting in the requirement that a highly accurate spindle stop mechanism must also be fabricated. In addition, if the tools should angularly deviate even slightly during the transfer operation being performed by the transfer arm, insertion of the tools into the spindle and the magazine becomes extremely difficult.

Another tool changer is also known within which a protrusion is provided both on the spindle and upon each of the tools for positive drive therebetween, as shown for example, within U.S. Pat. No. 3,791,022. This device can accomplish a tool change operation without stopping the spindle at a predetermined angular position and is not required to provide clamping means for each of the tools in order to maintain the proper orientation of the same upon the magazine. However, a preliminary detection operation is necessary in order to predetermine whether or not the protrusion of a tool, which will be inserted into the spindle, may interfere with that of the spindle and as a result, if interference is anticipated, the angular phase of the spindle has to be altered.

SUMMARY OF THE INVENTION

Accordingly, it is an object of the present invention to provide a machine tool with a tool changer which not only has the merits of, but is also devoid of the demerits of, the prior art apparatus.

Another object of the present invention is to provide a machine tool with a tool changer which is capable of preventing or avoiding any interference between the protrusions of the spindle and tools during a tool insertion operation by providing interference preventers upon a storage magazine.

Still another object of the present invention is to provide a machine tool with a tool changer which can reduce the tool changing time characteristic of the prior art apparatus.

A further object of the present invention is to provide a machine tool with a tool changer within which a highly accurate spindle stop mechanism is no longer indispensable.

Briefly, the foregoing and other objects are achieved according to the present invention through the provision of a new and improved machine tool which comprises a tool spindle having a drive protrusion, a storage magazine for storing a plurality of tools each of which has a driven protrusion, stop means for stopping the spindle at a predetermined angular position, interference preventers for preventing the driven protrusions of the tools within the magazine from moving to angular positions corresponding to the predetermined angular position of the spindle and the drive protrusion, an exchange arm for exchanging the tools between the spindle and the magazine, and inching means for inching the spindle in order to achieve the positive engagement of the drive and driven protrusions.

The drive protrusion and the interference preventers have a corresponding relationship with respect to the angular positional sector of the device, while the driven protrusions of the tools are held at angular positions exteriorly of the predetermined angular position or sector, and consequently, no interference occurs when a tool is inserted into the spindle. As the angular extent or sector, within which the tools are held, is quite large, neither a highly accurate spindle stop means nor a precise drive means, such as for example, a key and a key-way, is required for reliable operation of the apparatus according to the present invention. Moreover, it is unnecessary to re-adjust the angular phase or disposition of the spindle, whereby reduction of the tool exchange time is able to be accomplished, the same also contributing in enhancing the total machining efficiency.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a schematic diagram illustrating the basic operation of the present invention;

FIG. 2 is a front elevation view of a machine tool constructed in accordance with the present invention;

FIG. 3 is a longitudinal cross-section view of the apparatus shown in FIG. 2 taken along the line III–III of FIG. 2;

DETAILED DESCRIPTION OF A PREFERRED EMBODIMENT

Figure 4:
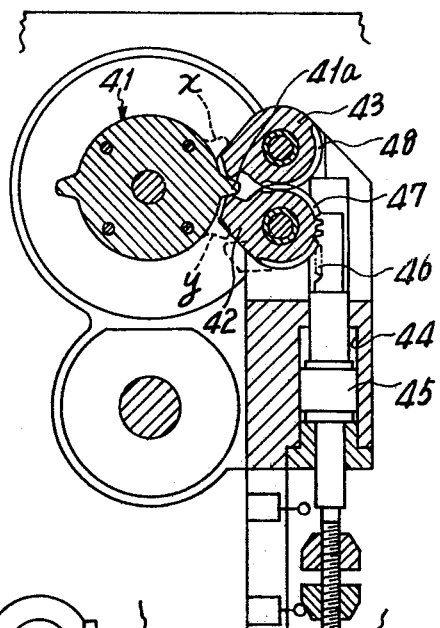
FIG. 4 is a fragmental cross-sectional view of the apparatus shown in FIG. 3 taken along the line IV–IV of FIG. 3.

Referring now to the drawings, and more particularly to FIG. 1 thereof, a tool spindle 10 and each of the tools 11 are respectively provided with a drive protrusion 10a and a driven protrusion 11a, the drive protrusion 10a being such as to be positively engaged with the driven protrusion 11a of the tool 11 which is inserted within the spindle 10 whereby the rotational movement of the spindle 10 is able to be transmitted to the tool 11.

The spindle 10 is stopped at a predetermined angular position prior to a tool exchange operation, and corresponding to such spindle stop position, the tool 11, to be inserted within spindle 10, is disposed within a circumferential area having an angular extent $\theta_2$ such that the driven protrusion 11a thereof does not interfere with the driven protrusion 10a of the spindle 10. It is to be noted that if the protrusion 11a of the tool 11 was disposed within the circumferential area having an angular extent $\theta_1$, the protrusions 10a and 11a would interfere with each other which would result in the obstruction of the tool insertion into the spindle 10, it therefore being required to dispose the protrusion 11a of the tool 11 within the circumferential area having the angular extent $\theta_2$ to prevent such from occurring. In order to therefore accomplish this purpose, at each of the storage portions or stations of a storage magazine 24, an interference preventer 14 protrudes therefrom which prevents the driven protrusion 11a from entering the circumferential area having an angular extent $\beta_1$ corresponding to the extent $\theta_1$, the preventer 14 not, however, restraining the angular position of the protrusion 11a within the circumferential area of angular extent $\beta_2$.

Consequently, it may be appreciated that when an exchange arm 13 inserts a tool, which has been removed from the magazine 24 by means of one of the grippers 13a and 13b of the arm 13, into spindle 10, the driven protrusion 11a does not experience an interference with the drive protrusion 10a and in fact is disposed with respect to the same within the angular or arcuate distance defined therebetween. In order to positively engage the protrusions 10a and 11a with each other, the spindle 10 is rotated through a predetermined angle while the gripper 13a nevertheless supports the tool 11. Subsequently, clamping of the tool 11 to the spindle 10 and further releasing of the tool 11 from the gripper 13a are accomplished in order to ready the apparatus for the next machining operation.

Referring now to FIGS. 2 to 6, an embodied apparatus is disclosed in detail, and is seen to include a machine tool which has a column 20 upon which a spindle head 21, rotatably supporting a tool spindle 10, is slidably guided in the vertical direction, and which is also mounted to be slidable, within a horizontal plane and longitudinally and transversely of or with respect to a work table 22 upon which a rotary index table 23 is mounted to support one or more workpieces W. At the top of column 20, a storage magazine 24, for storing a plurality of tools 11, is indexably mounted so as to present one of the tools 11 to a ready station which is located directly above the spindle 10. The exchange arm 13, whose detail has been explained within U.S. Patent Application, Ser. No. 387,002, entitled "An Automatic Tool Changing Apparatus" filed on Aug. 9, 1973, is disposed upon the column 20, and is interposed between the magazine 24 and the spindle 10 so as to be operable for, sequentially gripping the tools 11 deposited or disposed within the magazine 24 and the spindle 10 by means of power actuated grippers 13a and 13b, removing the tools 11 therefrom, replacing the tools 11 after traversing a rotation of 180°, inserting the replaced tools 11 thereinto, and releasing the tools 11 from the grippers 13a and 13b, when an exchange instruction or signal is given.

Within FIG. 3, the spindle 10 is formed with a tapered bore 15 at the front or forward end thereof, and it is seen that the drive protrusion 10a projects therefrom. A tool 11 inserted within bore 15 is connectable with a clamp mechanism which is so arranged within spindle 10 as to define a snap-fit between a pull stud 16 of the tool 11 and a snap head 32 and a ball, not numbered, the head 32 being drawn backwardly by means of a spring 30 interposed between the spindle 10 and a slidable drawing rod 31. A releasing actuator 33 is provided upon the spindle head 21 with a piston member 34 facing the rear end of the rod 31. The piston member 34 rotatably supports a shaft or rod 34a in co-axial alignment therewith through means of a pair of bearings, not numbered, and it is therefore noted that rotational torque hardly affects the piston member 34 even when the spindle 10 is rotated subsequent to the piston member 34 being advanced as shown in order to contact the shaft or rod 34a and push the rod 31 forwardly against the biasing action of spring 30 so as to unclamp the tool 11.

A gear 34 is keyed upon spindle 10 and has two gear wheel portions 35a and 35b at opposite ends thereof which are selectively engageable with gear wheel portions, not numbered, of a drive gear 36. The gear 36 is mounted, through means of a splined connection, upon a counter-shaft 38, one end of which is connected with an output shaft 37a of a variable speed motor 37 which is in turn mounted upon the spindle head 21 by means of a drive coupling 39. The coupling 39 is seen to include a disc 39a which is operatively cooperable with a brake unit 40.

An index plate 41, having an index boss 41a, is fixed upon the rear end of spindle 10, and in response to a stop instruction or signal, the spindle 10 is stopped at an angular position so as to facilitate the boss 41a being engageable with a pair of pivotal claws 42 and 43 as shown within FIG. 4. The claws 42 and 43 are engaged with each other through means of pinion gears 47 and 48 thereof, one of which is also engaged with a rack member 46 formed upon one end of a piston 45 of a fluid actuator 44. The piston 45, when actuated downwardly, closes the claws 42 and 43 thus positioning the boss 41a or the spindle 10 at a predetermined angular position. In this condition, the above-mentioned drive protrusion 10a occupies the angular position as shown within FIG. 1.

Figure 5:
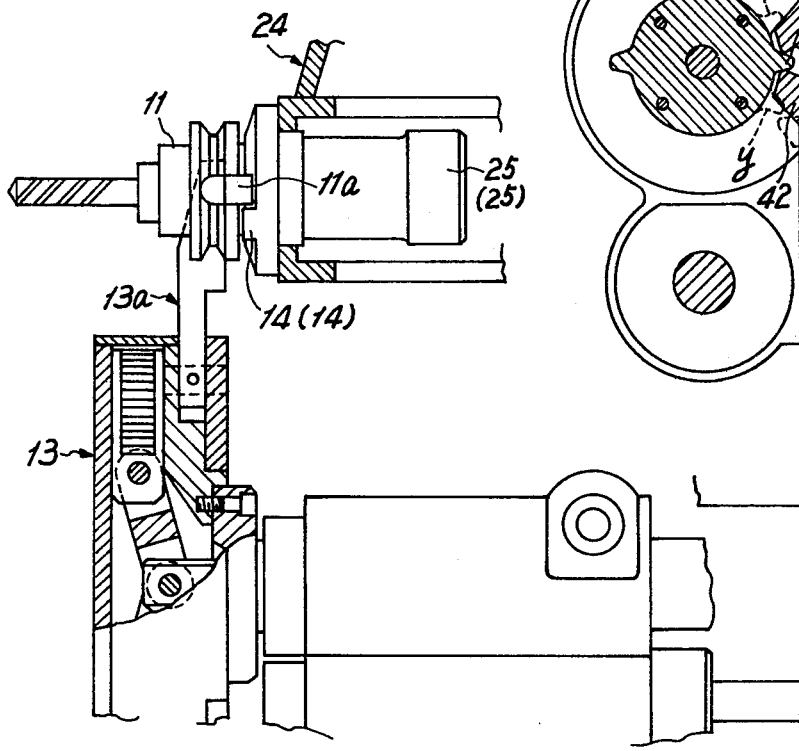
FIG. 5 is a fragmental cross-sectional view of the apparatus shown in FIG. 2 taken along the line V–V of FIG. 2, showing particularly one of the storage sockets mounted upon the storage magazine.

A plurality of interference preventers 14, one of which is typically shown within FIG. 5, protrude from the open ends of storage sockets 25 which are disposed upon the outer periphery of the storage magazine 24 in an equiangular arrangement thereabout. The preventers 14 are arcuately configured and the angular positions of such preventers correspond to that of the drive protrusion 10a under the aforenoted condition, and in this manner serve to prevent the driven protrusions 11a of tools 11 stored within sockets 25 from entering into the circumferential areas having angular extents $\beta_1$ which are occupied thereby. Within this embodiment, as the exchange arm 13 exchanges the tools 11 as a result of an angular rotation of 180°, each of the preventers 14 is disposed and displaced from the drive protrusion 10a by means of an angular relationship or displacement equal to one-half revolution.

Operation of the above described apparatus will now be explained hereinbelow. When a machining operation is completed, the spindle head 21 returns to the original position as shown within FIG. 2, whereupon the rotation of the spindle 10 is so terminated as to position the boss 41a within either of the positions x or y as shown within FIG. 4. This rotational termination can in fact be accomplished by activating the brake unit 40, by means of an approximate switch, not shown, which causes the deactivation of motor 37 and the activation of brake unit 40 when the boss 41a comes, for example, into the vicinity of the position y. Subseqently, piston 45 is moved downwardly so as to close the claws 42 and 43, and consequently, the boss 41a, or in other words, the drive protrusion 10a, may be positioned at the predetermined angular position.

The storage magazine 24 has been previously appropriately indexed, and a tool to be used next is therefore presented to the ready station. At such time, the exchange arm 13 grips the tools 11 held upon the spindle 10 and the magazine 24 by means of the grippers 13a and 13b thereof, and in order to release the tool 11 from the spindle 10, the piston 34 is advanced so as to push the rod 31 forwardly against the biasing force of spring 30. The arm 13 thereupon moves away from the column 20 so as to remove the gripped tools 11 from the spindle 10 and the socket 25, and the gripped tools are rotated through an angular displacement of one half revolution of arm 13, subsequent to which, arm 13 is again moved toward the column 20 with the result of inserting tools 11 into spindle 10 and socket 25. The protrusion 11a of the tool 11 inserted into the spindle 10 is within the circumferential area having an angular extent $\theta 2$, while that of the tool 11 inserted into the socket 25 is within the circumferential area having an angular extent $\beta 2$, and consequently, no interference occurs during the insertion process.

Figure 6:
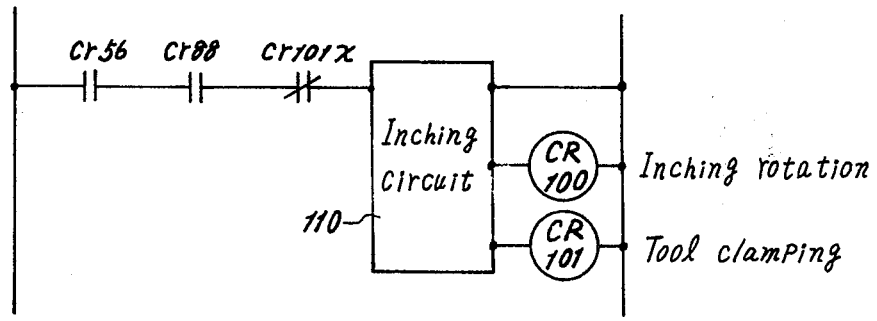
FIG. 6 is a partial schematic diagram of an electric control circuit employed within the apparatus of the present invention.

At the same time that the clearance is established between the protrusions 10a and 11a of the spindle 10 and the tool 11 in the rotational direction, the motor 37 is inched so as to positively engage the protrusion 10a with the protrusion 11a after the piston 45 has been moved upwardly. FIG. 6 shows a control circuit concerned with such positive engagement operation wherein an inching circuit 110 is activated through means of normally open contacts cr56 and cr88, and a normally closed contact cr101x, which are in fact closed when the arm 13 has inserted the tools 11 with the grippers 13a and 13b closed, and when the snap head 32 still continues the unclamping condition.

The inching circuit 110, having been activated, energizes a relay CR100 for a predetermined period of time so as to rotate the spindle 10, and the same further energizes another relay CR101 in order to retract the piston 34 after the period of time expires. Accordingly, the tool 11 inserted into the spindle 10 is firmly clamped in such a condition that the protrusion 10a positively engages the protrusion 11a. Thereafter, the grippers 13a and 13b are opened, and the movement of the spindle head 21 to the machining position, and the rotation of the spindle 10, are again initiated in order to perform the next machining operation with the new tool 11.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. A machine tool with an automatic tool changer comprising:
 a tool spindle rotatably supported for a power drive operation and provided with a drive protrusion for driving a tool inserted therein;
 a storage magazine having a plurality of storage sockets for respectively removably storing tools therein, each of said tools being provided with a driven protrusion for accomplishing a positive drive with said tool spindle by engagement between said drive and driven protrusions;
 spindle stop means for stopping said tool spindle and said drive protrusion thereof at a predetermined angular position prior to a tool exchange operation;
 tool exchange means for exchanging a tool inserted into said tool spindle with one of said tools stored upon said storage magazine;
 a plurality of interference preventers respectively protruding from open ends of said storage sockets and extending circumferentially of said storage socket through a first arcuate portion or sector less than one-half the circumferential extent of said storage socket for holding said driven protrusions of said tools externally of the angular extent of said first arcuate portion in a stored state, said first arcuate portion angularly corresponding to the width of said drive protrusion in the rotational direction of said tool spindle, so as to prevent said driven protrusion of one of said tools from being axially aligned with said drive protrusion positioned at said predetermined angular position when said one of said tools is inserted into said tool spindle; and
 inching means for inching said tool spindle so as to drivingly engage said drive protrusion with said driven protrusion of said one of said tools inserted into said tool spindle.

2. A machine tool as set forth in claim 1, wherein:
 said storage magazine is rotatable so as to present one of said storage sockets at a ready station which is disposed parallel with said tool spindle;
 said tool exchange means includes a swing arm which can interchange a tool disposed at said ready station with a tool disposed upon said tool spindle through a half revolution thereof; and
 each of said interference preventers is provided upon said storage socket associated therewith at such an angular position that an interference preventer of a storage socket presented at said ready station is advanced one-half revolution from said drive protrusion positioned at said predetermined angular position.

3. A machine tool as set forth in claim 2, wherein:
 each of said interference preventers is of arcuate shape, the widths within the circumferential direction of which corresponding to that of said drive protrusion of said tool spindle.

4. A machine tool as set forth in claim 3, wherein said stop means comprises:
 an index plate fixedly disposed upon said spindle and including a boss protruding from said plate in the radial direction; and
 a power actuated position adjusting mechanism for engaging with and rotating said boss to said predetermined angular position after said boss is stopped within a predetermined angular vicinity of said position.

5. A machine tool as set forth in claim 4, wherein said adjusting mechanism comprises:
 a pair of pivotal claws engageable with said boss within said angular vicinity; and
 a hydraulic actuator for selectively opening and closing said claws.

* * * * *